United States Patent
Wang et al.

(10) Patent No.: US 10,444,879 B2
(45) Date of Patent: Oct. 15, 2019

(54) TOUCH ELECTRODE STRUCTURE AND TOUCH DISPLAY PANEL

(71) Applicants: BOE Technology Group Co., Ltd., Beijing (CN); Hefei Xinsheng Optoelectronics Technology Co., Ltd., Hefei (CN)

(72) Inventors: Zhun Wang, Beijing (CN); Jun Xu, Beijing (CN); Lei Zhang, Beijing (CN); Jiawei Xu, Beijing (CN)

(73) Assignees: BOE Technology Group Co., Ltd., Beijing (CN); Hefei Xinsheng Optoelectronics Technology Co., Ltd., Hefei (CN)

( * ) Notice: Subject to any disclaimer, the term of this patent is extended or adjusted under 35 U.S.C. 154(b) by 0 days.

(21) Appl. No.: 15/742,711

(22) PCT Filed: Jun. 20, 2017

(86) PCT No.: PCT/CN2017/089172
§ 371 (c)(1),
(2) Date: Jan. 8, 2018

(87) PCT Pub. No.: WO2018/059018
PCT Pub. Date: Apr. 5, 2018

(65) Prior Publication Data
US 2018/0373367 A1   Dec. 27, 2018

(30) Foreign Application Priority Data

Sep. 29, 2016   (CN) .......................... 2016 1 0865706

(51) Int. Cl.
*G06F 3/041*   (2006.01)
*G06F 3/044*   (2006.01)
*G06F 3/0488*   (2013.01)

(52) U.S. Cl.
CPC ............ *G06F 3/0412* (2013.01); *G06F 3/044* (2013.01); *G06F 3/0488* (2013.01)

(58) Field of Classification Search
None
See application file for complete search history.

(56) References Cited

U.S. PATENT DOCUMENTS 8,593,425 B2 *  11/2013  Hong ..................... G06F 3/0412
                                                      345/173
8,994,682 B2 *  3/2015  Hashimoto ........... G06F 3/0418
                                                      345/173
(Continued)

FOREIGN PATENT DOCUMENTS

CN   102880365 A   1/2013
CN   104866130 A   8/2015
(Continued)

OTHER PUBLICATIONS

Sep. 22, 2017—International Search Report and Written Opinion Appn PCT/CN2017/089172 with Eng Tran.
(Continued)

*Primary Examiner* — Dorothy Harris
(74) *Attorney, Agent, or Firm* — Banner & Witcoff, Ltd.

(57) ABSTRACT

A touch electrode structure and a touch display panel are provided. The touch electrode structure includes a plurality of first touch electrodes and a plurality of second touch electrodes. The plurality of first touch electrodes are extending along a first direction, each of the first touch electrodes has a shape of a polygon and includes a plurality of first edges, a range of an angle between an extension direction of each of the first edges and the first direction is 20 to 25 degrees; the plurality of second touch electrodes are extending along a second direction, each of the second touch electrodes has a shape of a polygon and includes a plurality
(Continued)

of second edges, a range of an angle of an extension direction of each of the second edges and the second direction is 20 to 25 degrees.

12 Claims, 4 Drawing Sheets

(56) References Cited

U.S. PATENT DOCUMENTS

| | | | |
|---|---|---|---|
| 9,582,131 B2* | 2/2017 | Elias | G06F 3/044 |
| 2008/0062148 A1* | 3/2008 | Hotelling | G02F 1/13338 |
| | | | 345/174 |
| 2010/0328228 A1* | 12/2010 | Elias | G06F 3/044 |
| | | | 345/173 |
| 2012/0044165 A1* | 2/2012 | Kwak | G06F 3/044 |
| | | | 345/173 |
| 2013/0016363 A1* | 1/2013 | Iwamoto | G06F 3/044 |
| | | | 356/616 |
| 2014/0049704 A1* | 2/2014 | Yao | G02F 1/13338 |
| | | | 349/12 |
| 2014/0062934 A1* | 3/2014 | Coulson | G06F 3/044 |
| | | | 345/174 |
| 2014/0225844 A1 | 8/2014 | Tada et al. | |
| 2014/0375903 A1 | 12/2014 | Westhues et al. | |
| 2015/0015498 A1* | 1/2015 | Wang | G06F 3/041 |
| | | | 345/173 |
| 2015/0109248 A1* | 4/2015 | Tokai | G06F 3/044 |
| | | | 345/174 |
| 2015/0242005 A1 | 8/2015 | Lee et al. | |

FOREIGN PATENT DOCUMENTS

| | | |
|---|---|---|
| CN | 105556444 A | 5/2016 |
| CN | 105589600 A | 5/2016 |
| CN | 205302231 U | 6/2016 |
| CN | 105739734 A | 7/2016 |
| CN | 106249963 A | 12/2016 |
| KR | 1020130086577 A | 8/2013 |

OTHER PUBLICATIONS

Aug. 1, 2018—(CN) First Office Action Appn 201610865706.3 with English Translation.

* cited by examiner

TOUCH ELECTRODE STRUCTURE AND TOUCH DISPLAY PANEL

The application is a U.S. National Phase Entry of International Application No. PCT/CN2017/089172 filed on Jun. 20, 2017, designating the United States of America and claiming priority to Chinese Patent Application No. 201610865706.3 filed on Sep. 29, 2016. The present application claims priority to and the benefit of the above-identified applications and the above-identified applications are incorporated by reference herein in their entirety.

TECHNICAL FIELD

Embodiments of the present disclosure relate to a touch electrode structure and a touch display panel.

BACKGROUND

With the continuous development of display technology, display panel gradually enters a high-resolution era, PPI (Pixels Per Inch) of the display panel gradually approaches 300 or even higher. On the other hand, with the continuous development of touch technology, the touch technology is widely used in electronic products such as a mobile phone, a tablet computer, and a notebook computer and so on.

Generally, the touch technology includes different technical directions such as optical, resistive, capacitive, and electromagnetic touch technologies; among the various touch technologies, the capacitive touch technology has become a mainstream of the touch technology due to its low cost and excellent user experience. The capacitive touch technology may be divided into two modes including a self-capacitance mode and a mutual-capacitance mode. The mutual-capacitance touch technology has become a mainstream of the market and a trend of the future development since it may achieve multi-touch.

SUMMARY

At least one embodiment of the present disclosure provides a touch electrode structure and a touch display panel. In the touch electrode structure, a plurality of first touch electrodes and a plurality of second touch electrodes are disposed as polygons, a range of an angle between each edge of the first touch electrodes and a first direction is set to be 20 to 25 degrees, and a range of an angle between each edge of the second electrodes and a second direction is set to be 20 to 25 degrees, so that a moire pattern may be avoided in the touch display panel adopting the touch electrode structure.

At least one embodiment of the present disclosure provides a touch electrode, which includes a base substrate; a plurality of first touch electrodes disposed on the base substrate and extending along a first direction; and a plurality of second touch electrodes disposed on the base substrate and extending along a second direction, and each of the first touch electrodes has a shape of a polygon and includes a plurality of first edges, a range of an angle between an extension direction of each of the first edges and the first direction is 20 to 25 degrees, each of the second touch electrodes has a shape of a polygon and includes a plurality of second edges, a range of an angle of an extension direction of each of the second edges and the second direction is 20 to 25 degrees.

For example, in the touch electrode structure provided by an embodiment of the present disclosure, the polygon is a diamond.

For example, in the touch electrode structure provided by an embodiment of the present disclosure, adjacent ones of the first touch electrodes are electrically connected, and adjacent ones of the second touch electrodes are electrically connected by a strip-shaped bridge portion.

For example, the touch electrode structure provided by an embodiment of the present disclosure further includes: a plurality of first floating electrodes, disposed in one-to-one correspondence with the plurality of first touch electrodes one by one; and a plurality of second floating electrodes, disposed in one-to-one correspondence with the plurality of second touch electrodes; and each of the first floating electrodes includes two first sub floating electrodes, the two first sub floating electrodes are respectively disposed on two sides of the first touch electrode corresponding to the first floating electrode and spaced apart from the first touch electrode by a first distance, each of the second floating electrodes includes two sub floating electrodes, the two sub floating electrodes are respectively disposed on two sides of a second touch electrode corresponding to a second floating electrode and spaced apart from the second touch electrode by a second distance.

For example, in the touch electrode structure provided by an embodiment of the present disclosure, the plurality of first floating electrodes and the plurality of second floating electrodes are disposed in a region of the base substrate where the first touch electrodes and the second touch electrodes are not disposed, adjacent ones of the first floating electrodes and the second floating electrodes are separated by a third distance.

For example, in the touch electrode structure provided by an embodiment of the present disclosure, the first distance, the second distance and the third distance are less than 30 μm.

For example, in the touch electrode structure provided by an embodiment of the present disclosure, the first distance, the second distance and the third distance are equal.

For example, in the touch electrode structure provided by an embodiment of the present disclosure, the first direction is perpendicular to the second direction.

For example, in the touch electrode structure provided by an embodiment of the present disclosure, each of the first sub floating electrodes disposed on two sides of the first touch electrode includes a third edge opposite to a first edge of the first touch electrode and a first inclined edge extending in a third direction and a second inclined edge extending in a fourth direction, each of the second sub floating electrodes disposed on two sides of the second touch electrode includes a fourth edge opposite to a second edge of the second touch electrode and a third inclined edge extending in the third direction and a fourth inclined edge extending in the fourth inclined edge, the third direction is perpendicular to the fourth direction.

For example, in the touch electrode structure provided by an embodiment of the present disclosure, the first inclined edge, the second inclined edge, the third inclined edge and the fourth inclined edge each include a plurality of bending portions connected end to end, the bending portions include a first bending portion and a second bending portion, a range of an angle between an extension direction of the first bending portion and the first direction is 20 to 25 degrees, a range of an angle between an extension direction of the second bending portion and the second direction is 20 to 25 degrees.

For example, in the touch electrode structure provided by an embodiment of the present disclosure, the first touch electrodes include a touch drive electrode, the second touch electrodes include a touch sense electrode, or, the first touch electrodes include a touch sense electrode, the second touch electrodes include a touch drive electrode.

At least one embodiment of the present disclosure provides a touch display panel, which includes: a display panel; and a touch electrode structure disposed on the display panel, the touch electrode structure includes the touch electrode structure as mentioned above.

For example, in the touch display panel provided by an embodiment of the present disclosure, the touch electrode structure includes a plurality of first floating electrodes disposed in correspondence with the plurality of first touch electrodes one by one; and a plurality of second floating electrodes disposed in correspondence with the plurality of second touch electrodes one by one; each of the first floating electrodes includes two first sub floating electrodes, the two first sub floating electrodes are respectively disposed on two sides of a first touch electrode corresponding to a first floating electrode and spaced apart from the first touch electrode by a first distance, each of the second floating electrodes includes two sub floating electrodes, the two sub floating electrodes are respectively disposed on two sides of a second touch electrode corresponding to a second floating electrode and spaced apart from the second touch electrode by a second distance; the display panel includes a plurality of sub-pixel units configured to display, each of the sub-pixel units has a first width, and the first distance is less than the first width, the second distance is less than the first width.

For example, in the touch display panel provided by an embodiment of the present disclosure, the plurality of first floating electrodes and the plurality of second floating electrodes are disposed in a region of the base substrate where the first touch electrodes and the second touch electrodes are not disposed, adjacent ones of the first floating electrodes and the second floating electrodes are separated by a third distance, the third distance is less than the first width.

For example, in the touch display panel provided by an embodiment of the present disclosure, the plurality of sub-pixel units are arranged in a matrix, the first direction is a row direction of the matrix, the second direction is a column direction of the matrix.

For example, in the touch display panel provided by an embodiment of the present disclosure, the plurality of sub-pixel units have different colors, and the sub-pixel units in a same column have a same color.

BRIEF DESCRIPTION OF THE DRAWINGS

In order to clearly illustrate the technical solution of embodiments of the present disclosure, the drawings of the embodiments will be briefly described in the following, it is obvious that the drawings in the description are only related to some embodiments of the present disclosure and not limited to the present disclosure.

DETAILED DESCRIPTION

In order to make objects, technical details, and advantages of the embodiments of the present disclosure apparent, the technical solutions of the embodiments will be described in a clearly and fully understandable way in connection with the drawings related to the embodiments of the present disclosure. It is obvious that the described embodiments are just a part but not all of the embodiments of the present disclosure. Based on the described embodiments herein, a person having ordinary skill in the art may obtain other embodiment(s), without any inventive work, which should be within the scope of the disclosure.

Unless otherwise defined, the technical terms or scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly.

In a study, the inventor(s) of the application has found that: with the increase of PPI (Pixels Per Inch) of a display panel, the size of sub-pixel units in the display panel gradually decreases. In this case, a common touch electrode pattern interferes with a sub-pixel unit array to generate a moire pattern, thereby affecting the yield of the display panel. Therefore, in a design process of a touch electrode, in addition to considering an electrical property of the touch electrode, an optical property of the touch electrode may also be designed inevitably.

Embodiments of the present disclosure provide a touch electrode structure and a touch display panel. The touch electrode structure includes a base substrate and a plurality of first touch electrodes disposed on the base substrate, and a plurality of second touch electrodes disposed on the base substrate. The plurality of first touch electrodes are extending along a first direction, each of the first touch electrodes has a shape of a polygon and includes a plurality of first edges, a range of an angle between an extension direction of each of the first edges and the first direction is 20 to 25 degrees; the plurality of second touch electrodes are extending along a second direction, each of the second touch electrodes has a shape of a polygon and includes a plurality of second edges, a range of an angle of an extension direction of each of the second edges and the second direction is 20 to 25 degrees. Thus, the touch electrode structure is capable of avoiding the occurrence of a moire pattern in a touch display panel adopting the touch electrode structure.

Hereafter, the touch electrode structure and the touch display panel provided in the embodiments of the present disclosure will be described below with reference to the accompanying drawings.

First Embodiment

Figure 1:
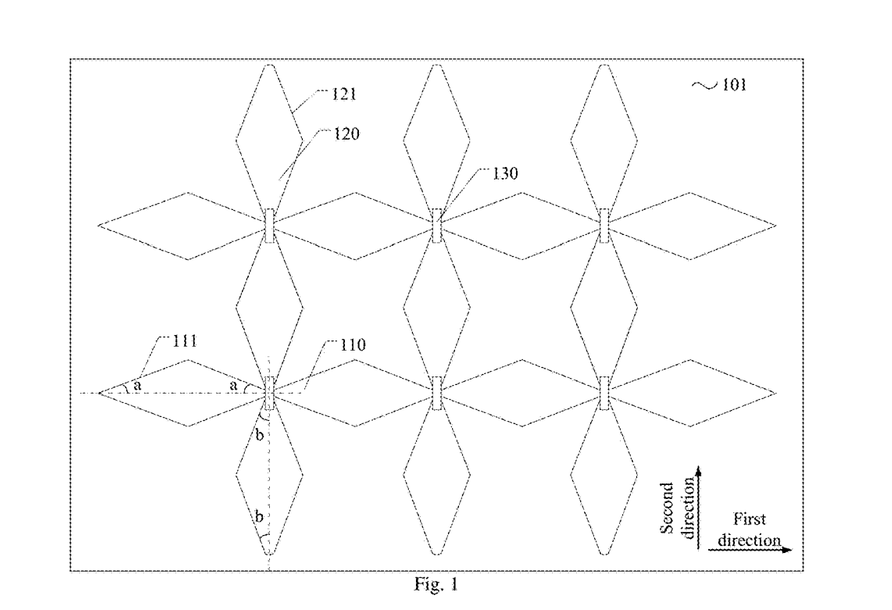
FIG. 1 is a planar view of a touch electrode structure provided by an embodiment of the present disclosure.

The present embodiment provides a touch electrode structure, as illustrated in FIG. 1, the touch electrode structure includes a base substrate 101 and a plurality of first touch electrodes 110 and a plurality of second touch electrodes 120 disposed on the base substrate 101. The plurality of first touch electrodes 110 are extending along a first direction, each of the first touch electrodes 110 has a shape of a polygon and includes a plurality of first edges 111, a range of an angle between an extension direction of each of the first edges 111 and the first direction is 20 to 25 degrees; the plurality of second touch electrodes 120 are extending along a second direction, each of the second touch electrodes 120 has a shape of a polygon and includes a plurality of second edges 121, a range of an angle of an extension direction of each of the second edges 121 and the second direction is 20 to 25 degrees. As illustrated in FIG. 1, a range of angle a between each of the first touch electrodes 110 and the first direction is 20 to 25 degrees, a range of angle b between each of the second touch electrodes 120 and the second direction is 20 to 25 degrees. It should be noted that, the first edges mentioned above may have a same angle with the first direction or may have different angles with the first direction, as long as the angle range is within 20 to 25 degrees.

In the touch electrode structure provided by the present embodiment, because the first touch electrodes and the second touch electrodes have a shape of a polygon, the angle range between the extension direction of each of the first edges and the first direction is within 20 to 25 degrees, and the angle range between the extension direction of each of the second edges and the second direction is 20 to 25 degrees, the touch electrode structure has a pattern that is not similar to a sub-pixel unit array configured to display. And edges of the first touch electrodes and the second touch electrodes may form an angle of 20 to 25 degrees with a row direction or a column direction of the sub-pixel unit array so as to avoid the interference between the edges and the sub-pixel unit array, thereby avoiding the occurrence of a moire pattern. On the other hand, because the edges of the first touch electrodes and the second touch electrodes may form the angle of 20 to 25 degrees with the row direction or the column direction of the sub-pixel unit array, in this case, the light passing through the edges (the first edges or the second edges) of the first touch electrodes and the second touch electrodes may come from sub-pixel units of different colors (sub-pixel units displaying different colors), along the edges (the first edges or the second edges) of each of the first touch electrodes and each of the second touch electrodes, a period of the sub-pixel units with the same color appeared consecutively may be shortened to a limit (there may be a good result in a case that the angle is 20 to 25 degrees) of the human eye resolution, thereby the moire pattern can be eliminated effectively. It should be noted that, the plurality of first touch electrodes extending along the first direction as mentioned above further include a plurality of rows of the first touch electrodes extending along the first direction to cover an entirety of the touch panel. Similarly, the plurality of second touch electrodes extending along the second direction as mentioned above further include a plurality of columns of the first second touch electrodes extending along the second direction to cover an entirety of the touch panel.

For example, in the touch electrode structure provided by an example of the present embodiment, as illustrated in FIG. 1, the polygon is a diamond, that is, each of the first touch electrodes 110 has a shape of the diamond and includes four first edges 111; each of the second touch electrodes 120 has a shape of the diamond and includes four second edges 121. Of course, the polygon may also be other polygons, such as a hexagon, and an octagon, and so on, the present embodiment is not limited thereto. In addition, a length of each of the first edges may be the same or different, a length of each of the second edges may be the same or different, the present embodiment is not limited thereto.

For example, in the touch electrode structure provided by an example of the present embodiment, as illustrated in FIG. 1, the first direction is perpendicular to the second direction. In a case that the touch electrode structure provided by the present embodiment is applied to a touch display panel, the first direction may be the row direction of the sub-pixel unit array in the touch display panel, the second direction may be the column direction of the sub-pixel unit array in the touch display panel, or the first direction may be the column direction of the sub-pixel unit array in the touch display panel, the second direction may be the row direction of the sub-pixel unit array in the touch display panel.

For example, in the touch electrode structure provided by an example of the present embodiment, as illustrated in FIG. 1, adjacent ones of the first touch electrodes 110 are electrically connected, and adjacent ones of the second touch electrodes 120 are electrically connected by a strip-shaped bridge portion 130. Thus, the first touch electrodes 110 and the second touch electrodes 120 may be disposed in the same layer, so that the thickness of the touch electrode structure provided by the present embodiment may be reduced, and it is more conductive to make the touch display panel (for example, a mobile phone) lighter and thinner by adopting the touch electrode structure provided by the present embodiment. For example, an insulating layer (not illustrated) is further disposed under the bridge portion 130 to insulate the bridge portion 130 from the first touch electrodes 110.

For example, in the touch electrode structure provided by an example of the present embodiment, the first touch electrodes may be touch drive electrodes, the second touch electrodes may be touch sense electrodes, or, the first touch electrodes may be touch sense electrodes, the second touch electrodes may be touch drive electrodes.

Second Embodiment

Figure 2:
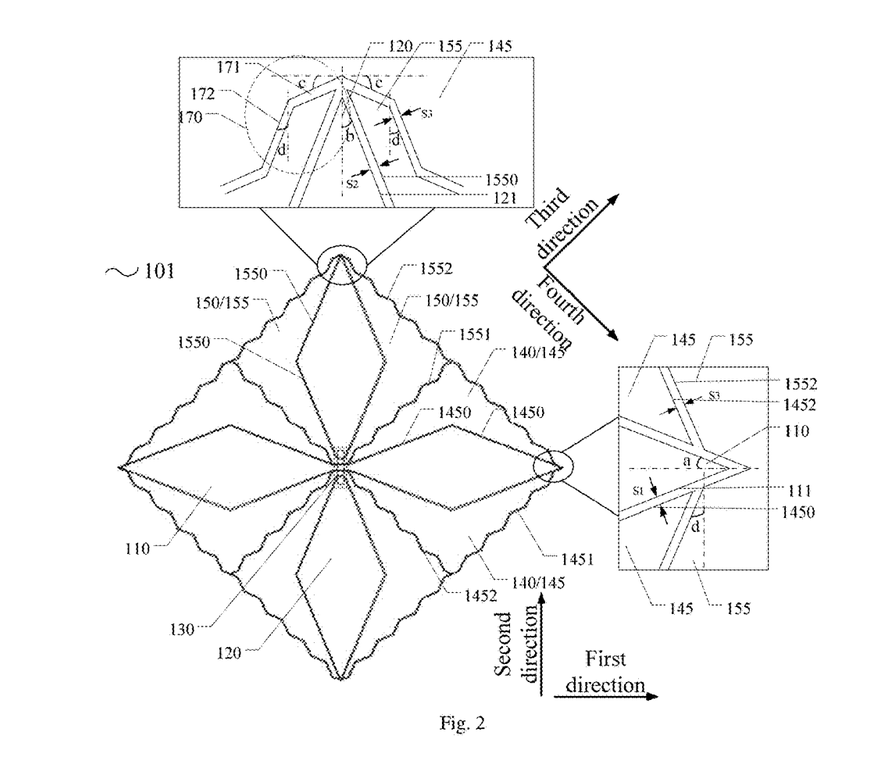
FIG. 2 is a planar view of another touch electrode structure provided by an embodiment of the present disclosure.

On the basis of the first embodiment, the present embodiment provides a touch electrode structure. FIG. 2 illustrates a view of a pattern unit of the touch electrode structure provided by the present embodiment, as illustrated in FIG. 2, the range of angle a between each of the plurality of first touch electrodes 110 and the first direction is 20 to 25 degrees, the range of angle b between each of the plurality of second touch electrodes 120 and the second direction is 20 to 25 degrees. The touch electrode structure further includes a plurality of first floating electrodes 140 and a plurality of second floating electrodes 150. The plurality of first floating electrodes 140 are disposed in one-to-one correspondence with the plurality of first touch electrodes 110, each of the first floating electrodes 140 includes two first sub floating electrodes 145, the two first sub floating electrodes 145 are respectively disposed on two sides of the first touch electrode 110 corresponding thereto and spaced apart from the first touch electrode 110 by a first distance S1. The plurality of second floating electrodes 150 are disposed in one-to-one correspondence with the plurality of second touch electrodes 120, each of the second floating electrodes 150 includes two second sub floating electrodes 155, the two second sub floating electrodes 155 are respectively disposed on two sides of the second touch electrode 120 corresponding thereto and spaced apart from the second touch electrode 120 by a second distance S2. Thus, the plurality of first floating electrodes 140 and the plurality of second floating electrodes 150 may reduce the capacitance between the first touch electrodes 110 and the second touch electrodes 120 to improve the accuracy of touch control, and may make the light transmittance of the entirety of the touch electrode structure more uniform so as to improve the display effect of the touch display panel adopting the touch electrode structure provided by the present embodiment. For example, the first floating electrodes and the second floating electrodes may made of the same material as the first touch electrodes and the second touch electrodes, and the first floating electrodes and the second floating electrodes may have the same thickness as the first touch electrodes and the second touch electrodes to further increase the uniformity of the light transmittance of the entirety of the touch electrode structure.

For example, in the touch electrode structure provided by the present embodiment, as illustrated in FIG. 2, the plurality of first floating electrodes 140 and the plurality of second floating electrodes 150 are disposed in a region of the base substrate 101 where the first touch electrodes 110 and the second touch electrodes 120 are not disposed, and adjacent ones of the first floating electrodes 140 and the second floating electrodes 150 are separated by a third distance S3. Thus, an area ratio of the first touch electrodes, the second touch electrodes, the first floating electrodes, and the second floating electrodes to the base substrate may be increased as much as possible by setting sizes of S1, S2, and S3, so that the uniformity of the light transmittance of the entirety of the touch electrode structure may be further improved, and the distances (S1, S2, and S3) among the first touch electrodes, the second touch electrodes, the first floating electrodes, and the second floating electrodes may be smaller than the width of the sub-pixel units in the touch display panel adopting the touch electrode structure provided by the present embodiment, so as to avoid the occurrence of the moire pattern phenomenon.

For example, in a case where the width of the sub-pixel units is 30 µm, the first distance S1, the second distance S2 and the third distance S3 are less than 30 µm.

For example, in the touch electrode structure provided by an example of the present embodiment, the first distance S1, the second distance S2 and the third distance S3 are equal.

For example, in the touch electrode structure provided by an example of the present embodiment, as illustrated in FIG. 2, each of the first sub floating electrodes 145 disposed on two sides of the first touch electrode 110 includes a third edge 1450 opposite to a first edge 111 of the first touch electrode 110 and a first inclined edge 1451 extending in a third direction and a second inclined edge 1452 extending in a fourth direction, each of the second sub floating electrodes 155 disposed on two sides of the second touch electrode 120 includes a fourth edge 1550 opposite to a second edge 121 of the second touch electrode 120 and a third inclined edge 1551 extending in the third direction and a fourth inclined edge 1552 extending in the fourth inclined edge, the third direction is perpendicular to the fourth direction. Thus, the two first sub floating electrodes disposed on two sides of the first touch electrode and the first touch electrode (including intervals between the first touch electrodes and the first sub floating electrodes) corresponding thereto may form a substantially rectangular pattern, the two second sub floating electrodes disposed on two sides of the second touch electrode and the second touch electrode (including intervals between the second touch electrodes and the second sub floating electrodes) corresponding thereto may form a substantially rectangular pattern, so as to cover the entirety of the base substrate.

For example, in the touch electrode structure provided by an example of the present embodiment, as illustrated in FIG. 2, the first inclined edge 1451, the second inclined edge 1452, the third inclined edge 1551 and the fourth inclined edge 1552 each includes a plurality of bending portions 170 connected end to end, the bending portions 170 include a first bending portion 171 and a second bending portion 172, an range of angle c between an extension direction of the first bending portion 171 and the first direction is 20 to 25 degrees, an range of angle d between an extension direction of the second bending portion 172 and the second direction is 20 to 25 degrees. Thus, the first bending portion and the second bending portion in the first inclined edge, the second inclined edge, the third inclined edge and the fourth inclined edge may form an angle of 20 to 25 degrees with a row direction or a column direction of a sub-pixel unit array, so as to avoid the occurrence of the moire pattern. On the other hand, because the first bending portion and the second bending portion may form the angle of 20 to 25 degrees with the row direction or the column direction of the sub-pixel unit array, in this case, the light passing through the first inclined edge, the second inclined edge, the third inclined edge and the fourth inclined edge may come from sub-pixel units of different colors (sub-pixel units displaying different colors), along the first inclined edge, the second inclined edge, the third inclined edge and the fourth inclined edge, a period of the sub-pixel units with the same color appeared consecutively may be shortened to a limit of the human eye resolution, thereby the moire pattern can be eliminated effectively.

Third Embodiment

Figure 3:
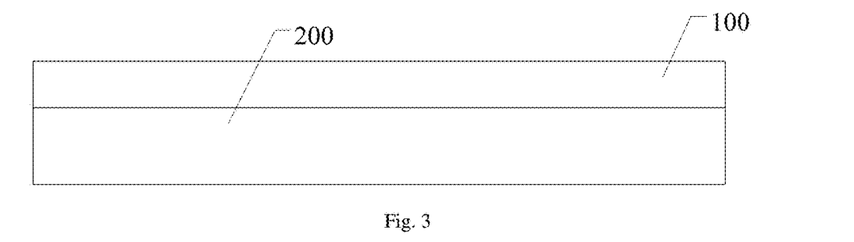
FIG. 3 is a planar view of a touch display panel provided by an embodiment of the present disclosure.

The present embodiment provides a touch display panel, as illustrated in FIG. 3, the touch display panel includes a display panel 200 and a touch electrode structure 100 disposed on the display panel 200, that is, the touch electrode structure 100 is disposed on one side of the display panel 200 for display. The touch electrode structure 100 may be the touch electrode structure as mentioned in the first embodiment. Thus, the touch display panel may eliminate a moire pattern phenomenon. In addition, the touch display panel has other technical effects corresponding to the touch electrode structure, and the repeated portions are omitted herein.

For example, in the touch display panel provided by an example of the present embodiment, the touch electrode structure 100 includes a plurality of first floating electrodes and a plurality of second floating electrodes. The plurality of first floating electrodes are disposed in correspondence with the plurality of first touch electrodes one by one, each of the first floating electrodes includes two first sub floating electrodes, the two first sub floating electrodes are respectively disposed on two sides of a first touch electrode corresponding to a first floating electrode and spaced apart from the first touch electrode by a first distance S1. The plurality of second floating electrodes are disposed in correspondence with the plurality of second touch electrodes one by one, each of the second floating electrodes includes two sub floating electrodes, the two sub floating electrodes are respectively disposed on two sides of a second touch electrode corresponding to a second floating electrode and spaced apart from the second touch electrode by a second distance S2 (referring to a relevant description in the second embodiment). The display panel 200 includes a plurality of sub-pixel units configured to display, each of the sub-pixel units has a first width, the first distance S1 is less than the first width, and the second distance S2 is less than the first width. Thus, the distance between the first touch electrodes and the first floating electrodes is less than the width of the sub-pixel units, the distance between the second touch electrodes and the second floating electrodes is less than the width of the sub-pixel units, so as to prevent the occurrence of the moire pattern phenomenon effectively.

For example, in the touch display panel provided by an example of the present embodiment, the plurality of first floating electrodes and the plurality of second floating electrodes are disposed in a region of the base substrate where the first touch electrodes and the second touch electrodes are not disposed, adjacent ones of the first floating electrodes and the second floating electrodes are separated by a third distance (referring to a relevant description in the second embodiment). The third distance is less than the first width, thus, the distance between the first floating electrodes and the second floating electrodes is less than the width of the sub-pixel units, so as to prevent the occurrence of the moire pattern phenomenon effectively.

For example, in the touch display panel provided by an example of the present embodiment, as illustrated in FIG. 4a to FIG. 4f, the plurality of sub-pixel units 210 are arranged in a matrix, the first direction is a row direction of the matrix, the second direction is a column direction of the matrix.

Figure 4A:
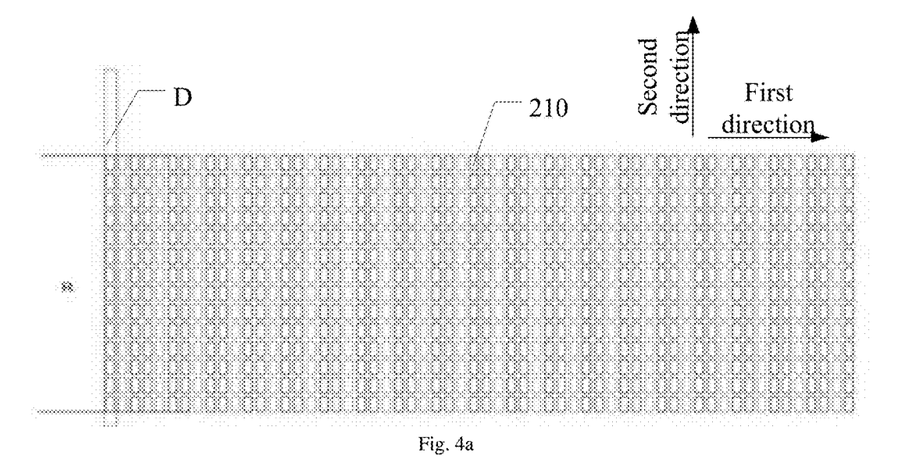
FIG. 4a to FIG. 4f are principle diagrams of a touch display panel eliminating a moire pattern provided by an embodiment of the present disclosure.
Figure 4B:
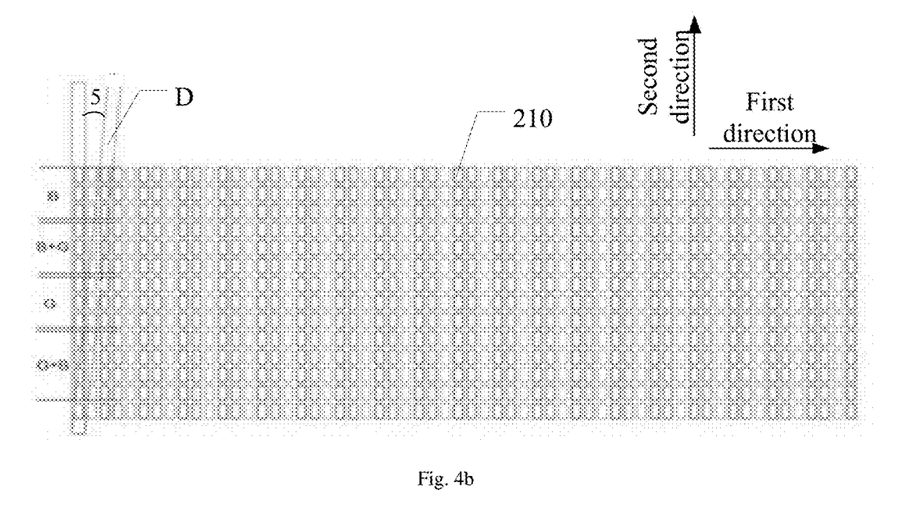
Figure 4C:
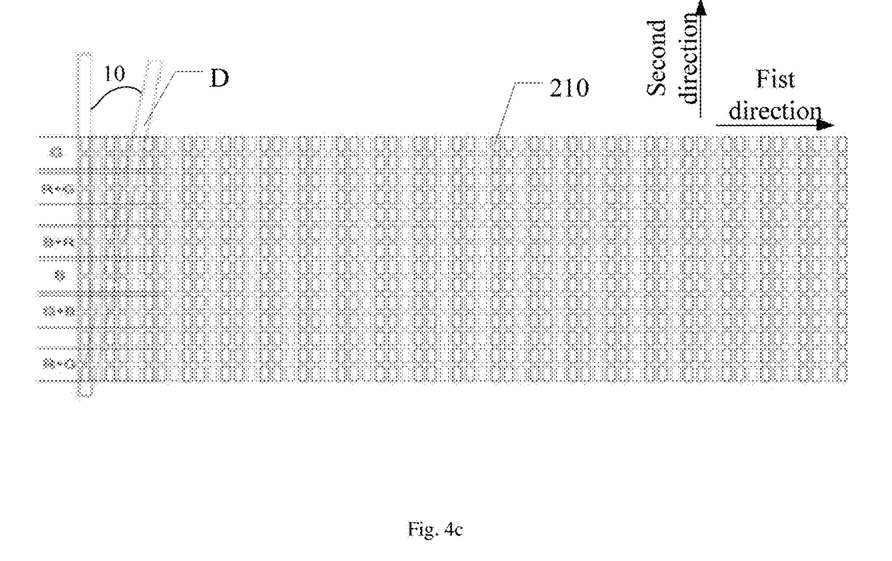
Figure 4D:
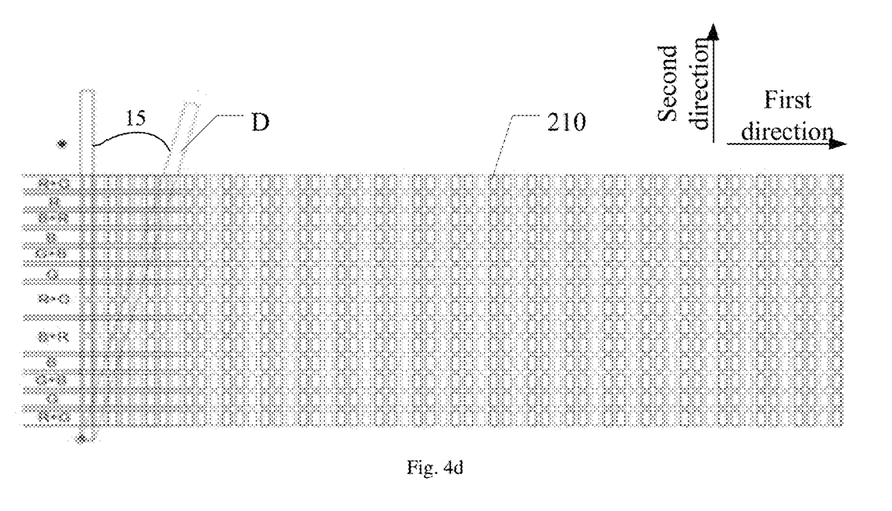
Figure 4E:
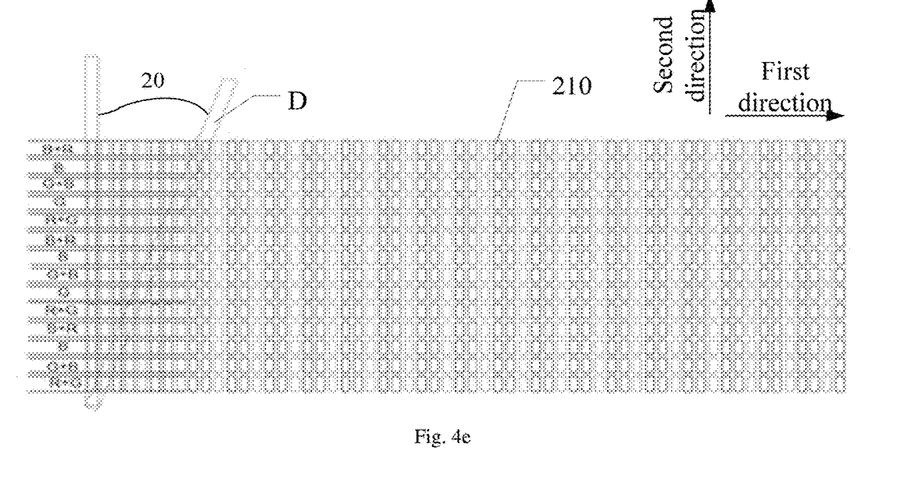
Figure 4F:
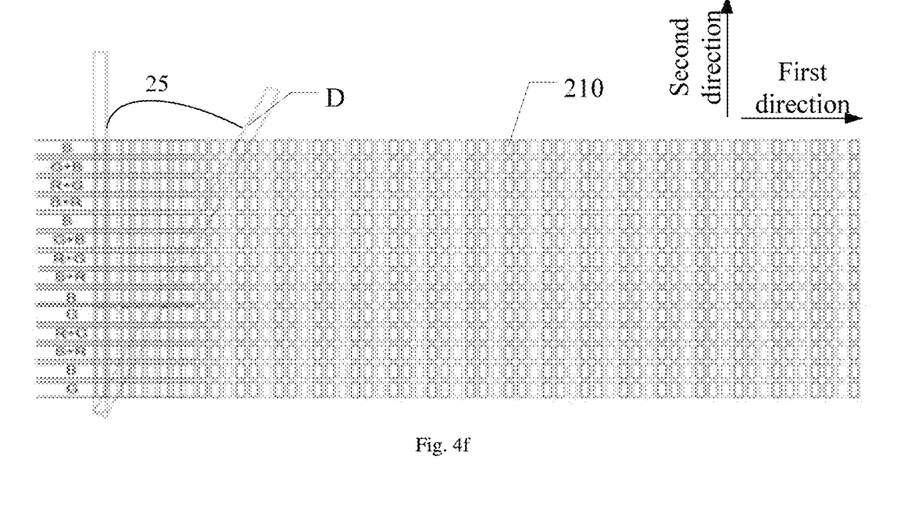

For example, in the touch display panel provided by an example of the present embodiment, as illustrated in FIG. 4a to FIG. 4f, the plurality of sub-pixel units 210 have different colors, and the sub-pixel units in a same column have a same color. FIG. 4a to FIG. 4f illustrate a case that the angle between the extending direction of the interval D between the first touch electrodes and the first floating electrodes, the second touch electrodes and the second floating electrodes, or the first floating electrodes and the second floating electrodes and the column direction of the sub-pixel unit array from 0 to 25 degrees, the color distribution of the light of the sub-pixel units passing through the interval D. As illustrated in FIG. 4a, in a case that the angle between the extension direction of the interval D and the column direction of the sub-pixel unit array is 0 degree, the light of the sub-pixel units passing through the interval D is red (or may be yellow or blue, the red is taken as an example herein), in this case, the moire pattern phenomenon is easy to occur. With the increase of the angle between the extension direction of the interval D and the column direction of the sub-pixel unit array, as illustrated in FIG. 4a to FIG. 4f, the color type of the sub-pixel units passing through the interval D increases gradually, a period of the sub-pixel units with the same color appeared consecutively may be shortened to a limit (there may be a good result in a case that the angle is 20 to 25 degrees) of the human eye resolution, thereby the moire pattern can be eliminated effectively.

The following points should to be explained:

1) The drawings of at least one embodiment of the present disclosure only relate to the structure in the embodiment of the present disclosure, and other structures may be referenced to the usual design.

2) For clarity purposes, the thickness and size of a layer or microstructure are amplified in the drawings for at least one embodiment of the present disclosure. It should be understood that, in a case that a component such as a layer, a membrane, a region, or a substrate is referred to be located "on" or "down" another element, the component may be located "on" or "down" the another element "directly", or may have an intermediate element.

3) In the absence of conflict, the features of the same embodiment and the different embodiments can be combined with each other.

The above are only specific implementations of the present disclosure. However the scope of the present disclosure is not limited thereto. Variations or substitutions that easily occur to any one skilled in the art within the technical scope disclosed in the present disclosure should be encompassed in the scope of the present disclosure. Therefore, the scope of the present disclosure should be based on the scope of the claims.

The present application claims priority of China Patent application No. 201610865706.3 filed on Sep. 29, 2016, the content of which is incorporated in its entirety as portion of the present application by reference herein.

What is claimed is:

1. A touch electrode structure, comprising:
a base substrate;
a plurality of first touch electrodes, disposed on the base substrate and extending along a first direction;
a plurality of second touch electrodes, disposed on the base substrate and extending along a second direction;
a plurality of first floating electrodes, disposed in a one-to-one correspondence with the plurality of first touch electrodes; and
a plurality of second floating electrodes, disposed in a one-to-one correspondence with the plurality of second touch electrodes,
wherein each of the first touch electrodes has a shape of a polygon and comprises a plurality of first edges, a range of an angle between an extension direction of each of the first edges and the first direction is 20 to 25 degrees, each of the second touch electrodes has a shape of a polygon and comprises a plurality of second edges, a range of an angle of an extension direction of each of the second edges and the second direction is 20 to 25 degrees,
wherein each of the first floating electrodes comprises two first sub floating electrodes, the two first sub floating electrodes are respectively disposed on two sides of a first touch electrode corresponding to the first floating electrode and spaced apart from the first touch electrode by a first distance, each of the second floating electrodes comprises two second sub floating electrodes, the two second sub floating electrodes are respectively disposed on two sides of a second touch electrode corresponding to the second floating electrode and spaced apart from the second touch electrode by a second distance,
wherein the plurality of first floating electrodes and the plurality of second floating electrodes are disposed in a region of the base substrate where the first touch electrodes and the second touch electrodes are not disposed, and adjacent ones of the first floating electrodes and the second floating electrodes are separated by a third distance,
wherein the first distance, the second distance, and the third distance are equal, and
wherein the two first sub floating electrodes disposed on two sides of the first touch electrode and the first touch electrode corresponding thereto form a substantially rectangular pattern, the two second sub floating electrodes disposed on two sides of the second touch electrode and the second touch electrode corresponding thereto form a substantially rectangular pattern, the first sub floating electrodes and the second sub floating electrodes are sub floating electrodes which are mutually independent.

2. The touch electrode structure according to claim 1, wherein the polygon is a diamond.

3. The touch electrode structure according to claim 1, wherein adjacent ones of the first touch electrodes are electrically connected, and adjacent ones of the second touch electrodes are electrically connected by a strip-shaped bridge portion.

4. The touch electrode structure according to claim 1, wherein the first distance, the second distance, and the third distance are less than 30 μm.

5. The touch electrode structure according to claim 1, wherein the first direction is perpendicular to the second direction.

6. The touch electrode structure according to claim 1, wherein each of the first sub floating electrodes disposed on two sides of the first touch electrode comprises a third edge opposite to a first edge of the first touch electrode, a first inclined edge extending in a third direction, and a second inclined edge extending in a fourth direction, each of the second sub floating electrodes disposed on two sides of the second touch electrode comprises a fourth edge opposite to a second edge of the second touch electrode, a third inclined edge extending in the third direction, and a fourth inclined edge extending in the fourth direction, wherein the third direction is perpendicular to the fourth direction.

7. The touch electrode structure according to claim 6, wherein the first inclined edge, the second inclined edge, the third inclined edge, and the fourth inclined edge each comprise a plurality of bending portions connected end to end, the bending portions comprise a first bending portion and a second bending portion, a range of an angle between an extension direction of the first bending portion and the first direction is 20 to 25 degrees, a range of an angle between an extension direction of the second bending portion and the second direction is 20 to 25 degrees.

8. The touch electrode structure according to claim 1, wherein the first touch electrodes comprise a touch drive electrode, the second touch electrodes comprise a touch sense electrode, or, the first touch electrodes comprise a touch sense electrode, the second touch electrodes comprise a touch drive electrode.

9. A touch display panel, comprising:
 a display panel; and
 a touch electrode structure disposed on the display panel, wherein the touch electrode structure comprises the touch electrode structure according to claim 1.

10. The touch display panel according to claim 9, wherein the display panel comprises a plurality of sub-pixel units configured to display, each of the sub-pixel units has a first width,
 wherein the first distance is less than the first width, the second distance is less than the first width.

11. The touch display panel according to claim 10, wherein the plurality of sub-pixel units are arranged in a matrix, the first direction is a row direction of the matrix, the second direction is a column direction of the matrix.

12. The touch display panel according to claim 11, wherein the plurality of sub-pixel units have different colors, and the sub-pixel units in a same column have a same color.

* * * * *